(12) United States Patent
Kudo et al.

(10) Patent No.: US 6,783,287 B2
(45) Date of Patent: Aug. 31, 2004

(54) FOCAL-PLANE SHUTTER FOR DIGITAL CAMERA

(75) Inventors: Kouichi Kudo, Tokyo (JP); Tohru Eguro, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 68 days.

(21) Appl. No.: 10/179,289

(22) Filed: Jun. 26, 2002

(65) Prior Publication Data

US 2003/0002877 A1 Jan. 2, 2003

(30) Foreign Application Priority Data

Jun. 27, 2001 (JP) ..................................... P2001-194998

(51) Int. Cl.[7] .............................................. G03B 9/40
(52) U.S. Cl. ...................................... 396/456; 396/489
(58) Field of Search ................................ 396/489, 452, 396/456, 479–81, 470; 348/362

(56) References Cited

U.S. PATENT DOCUMENTS

| | | | | |
|---|---|---|---|---|
| 4,364,654 A | * | 12/1982 | Senuma et al. | 396/466 |
| 6,536,962 B2 | * | 3/2003 | Takahashi | 396/466 |
| 2001/0010560 A1 | * | 8/2001 | Takahashi | |

FOREIGN PATENT DOCUMENTS

| | | | | |
|---|---|---|---|---|
| JP | 62-128675 | 6/1987 | | |
| JP | 11-326992 | 11/1999 | | |
| JP | 2002156685 A | * | 5/2002 | G03B/9/36 |
| JP | 2003005254 A | * | 1/2003 | G03B/9/36 |
| KR | 2002-73612 | 9/2003 | | |

* cited by examiner

*Primary Examiner*—David M. Gray
(74) *Attorney, Agent, or Firm*—McGinn & Gibb, PLLC

(57) ABSTRACT

When the main power of a camera is turned on, a set member (14) is rotated from an initial position to a set position by an operation member (15) on the camera side and once stops at a midway position. At this time, a second blade group (19) retreats from an aperture (1a) and a first blade group (16) enters the aperture 1a to a position not covering an image pickup device (4), so that the aperture (1a) is opened and it is made possible to display a subject in an electronic viewfinder. When a release button is pressed, the set member (14) is rotated from the midway position to the set position and thus the aperture (1a) is covered with the first blade group (16). After this, when drive members (10, 12) are attracted to iron cores (8, 9) and the set member (14) is restored to the initial position, the drive members perform light exposure operation in order.

20 Claims, 5 Drawing Sheets

FOCAL-PLANE SHUTTER FOR DIGITAL CAMERA

BACKGROUND OF THE INVENTION

This invention relates to a focal-plane shutter for a digital camera wherein to photograph, two blades consisting of a first blade and a second blade are operated in order in the same direction and the light reception face of an image pickup device is exposed to light through a slit formed by the first and second blades.

Generally, with a focal-plane shutter adopted for a conventional camera using a silver-salt film, first blades electromagnet and second blades electromagnet are previously energized before the light exposure operation of a first blade and a second blade. Then, the electromagnets is shut off in order at a predetermined timing by an output signal of a light exposure time control circuit, and a first blades drive member and a second blades drive member are rotated by the urging forces of a first blade drive spring and a second blade drive spring, thereby causing the first blade and the second blade to perform the light exposure operation.

Two types of configuration for holding the first blades drive member and the second blades drive member at the set position to the next photographing are known, usually called direct type and retention type. In the direct type, at the set position, the first blades drive member and the second blades drive member are brought into contact with the first blade electromagnet and the second blade electromagnet respectively, and when a release button of the camera is pressed at the next photographing, the electromagnets are energized and at the stage at which the drive members are reliably attracted by the magnetic forces of the electromagnets, a set member is restored to the initial position before the set operation.

In the retention type, the first blades drive member and the second blades drive member are retained at the set position by retention members and when a release button of the camera is pressed at the next photographing, the retention is released by the electromagnets. Therefore, in the retention type, a set member may be restored to the initial position immediately after completion of setting the drive members, or may be restored to the initial position before photographing in association with release as with the direct type described above.

By the way, a digital camera for photographing a subject by an image pickup device of a CCD, etc., for converting photograph light formed by a photographing lens into electric data adopts a focal-plane shutter of a similar type to the type described above, in which a first blade and a second blade are operated in order at a predetermined timing and continuous light exposure is conducted from one side of a light reception face of the image pickup device to an opposite side through a slit formed by the first and second blades.

Some of the digital cameras using a shutter of such a configuration are of the type in which an optical finder is provided as with the conventional camera and the light reception face is covered with at least either of the first and second blades except that photographing is conducted, and of the type in which a subject can be displayed by an electronic viewfinder implemented as a liquid crystal display, etc., for making it possible to view image data output from the image pickup device with the image pickup device exposed to photograph light even when photographing is not conducted. Therefore, in the latter type, to photograph, the first blade is operated to the position covering the light reception face before light exposure operation is performed.

FIG. 5 shows a related art as disclosed in JP-A-62-128675. The related art discloses a shutter of the direct type described above. When the camera power is turned on, as a motor lever 107 (operation member) is turned clockwise, a set lever 109 (set member) is turned counterclockwise from the initial position. Thus, an open blade drive lever 101 (first blades drive member) and a closed blade drive lever 104 (second blades drive member) are turned clockwise against the urging forces of a spring 103 (first blade drive spring) and a spring 106 (second blade drive spring) and the set completion state is entered. At this time, only the closed blade drive lever 104 is attracted to an electromagnet on the closed vane side (second blade electromagnet). After this, as the set lever 109 is restored to the initial position, the open blade drive lever 101 is operated to the open position, but the closed blade drive lever 104 is already attracted to the electromagnet and thus an aperture (opening) is opened by an open vane (first blades) and a closed vane (second blades) and it is made possible to display a subject through an electronic viewfinder.

When release operation is performed, the electromagnet on the closed vane side is demagnetized and thus the closed blade drive lever 104 is turned counterclockwise by the tension of the spring 6 for moving the closed vane to the position closing the aperture. After this, in a state in which both an electromagnet on the open vane side (first blade electromagnet) and the electromagnet on the closed vane side are excited as the set lever 109 is turned counterclockwise, the open blade drive lever 101 and the closed blade drive lever 104 are operated to the set completion position and are attracted to their respective electromagnets. After the open blade drive lever 101 and the closed blade drive lever 104 are thus attracted and held, when the set lever 109 is restored to the initial position by the urging force of a spring 111, the electromagnet on the open vane side and the electromagnet on the closed vane side are demagnetized in order, whereby the blades start the light exposure operation.

In such a control method, when the camera is not used, the shutter blade is closed to protect the image pickup device from direct sunlight and as the power is turned on, the aperture is opened; this point is desirable. On the other hand, however, from the time when the power is turned on, the closed blade drive lever 104 must be kept at the open position to display a subject on the electronic viewfinder and thus an electric current must be continuously supplied to the closed vane electromagnet and power consumption is noticeable; this is an extreme problem.

If the open position is kept by the attraction force of the closed vane electromagnet, when vibration or a shock is applied to the camera, it is transmitted to the shutter, whereby the closed blade drive lever 104 is not kept at the open position and is brought away from the open position and a malfunction of closing the aperture may occur. Thus, a countermeasure of increasing the electric current applied to the electromagnet for enlarging the attraction force is taken; however, also in this case, a power consumption problem occurs. Particularly, with the digital camera, the camera size is made small as compared with that of the conventional camera and thus the power supply volume is limited and photoelectric conversion of the image pickup device, display on the electronic viewfinder, image recording, and the like also consume power and thus there is strong demand to suppress power consumption as much as possible. Further, to suppress costs, the focal-plane shutter of the conventional camera may be used as that of the digital camera. In such a case, however, it is large demand to suppress change in the shutter configuration and change in the parts accompanying the change in the shutter configuration as much as possible for reducing costs together with suppression of power consumption described above.

SUMMARY OF THE INVENTION

It is an object of the invention to provide a focal-plane shutter for a digital camera for exposing the light reception face of an image pickup device to light through a slit formed by first and second blades, the focal-plane shutter being suited for a camera comprising an electronic view finder and appropriate for lower power consumption and cost reduction.

To the end, according to the invention, there is provided a focal-plane shutter for a digital camera, comprising a shutter base plate having an aperture for light exposure; a set member being capable of reciprocating on the shutter base plate, when the set member is moved by an operation member on the camera side and is operated from an initial position to a set position, the set member for operating a first blades drive member for driving a first blade and a second blades drive member for driving a second blade to the set position against urging forces of drive springs and before light exposure operation of each drive member starts, the set member being restored to the initial position in association with the operation member; and a first blade holding member and a second blade holding member for holding each drive member at a light exposure operation start position just before the light exposure operation starts and when the light exposure operation starts, releasing holding each drive member at a predetermined timing, wherein when the set member is operated from the initial position to the set position, at the initial stage, the set member operates at least the second blades drive member against the urging force of the drive spring and once stops at a midway position at which the second blade opens the aperture in association with motion of the operation member.

In the focal-plane shutter of the invention, if the slit formation margin of the first blade is made to enter the aperture to a position not covering the light reception face of an image pickup device placed on a photograph optical path passing through the aperture by the time the set member reaches the midway position from the initial position, the operation amount of the first blade from release to the set position is lessened, so that it is made possible to shorten the time required for the set operation. If the first blade holding member and the second blade holding member are each an electromagnet for attracting an iron piece member placed on each drive member, the configuration of the shutter is simplified.

DETAILED DESCRIPTION OF PREFERRED EMBODIMENTS

Figure 1:
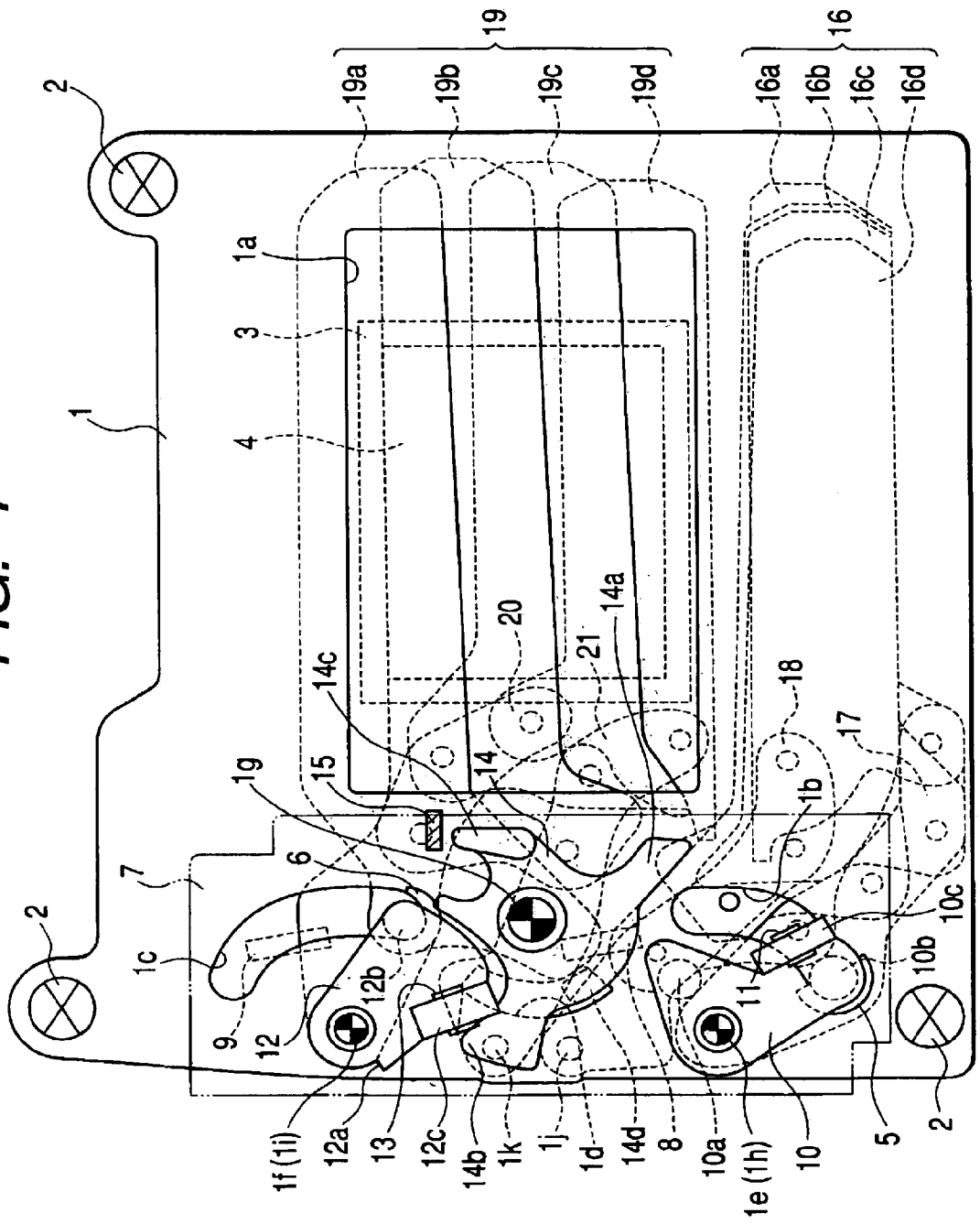
FIG. 1 is a plan view of an embodiment viewing a shutter from the subject side, namely, the photograph lens side and shows a state in which the main power of a camera is off or a state just after termination of light exposure operation.
Figure 2:
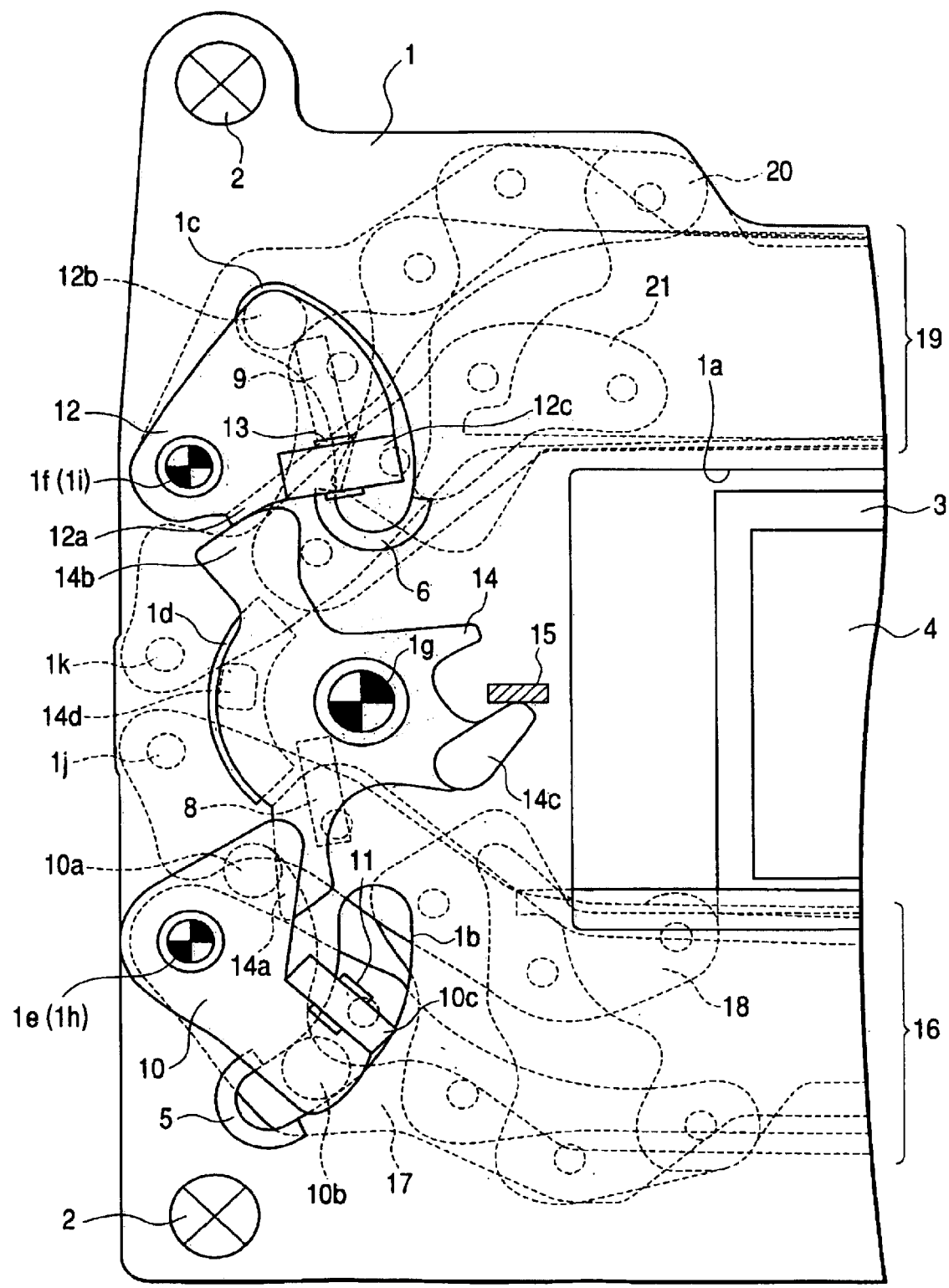
FIG. 2 is a plan view of the embodiment showing a part of the left of the view in FIG. 1 and shows the state of a midway position with a second blade group set from the state in FIG. 1, making it possible to observe on an electronic view finder.
Figure 3:
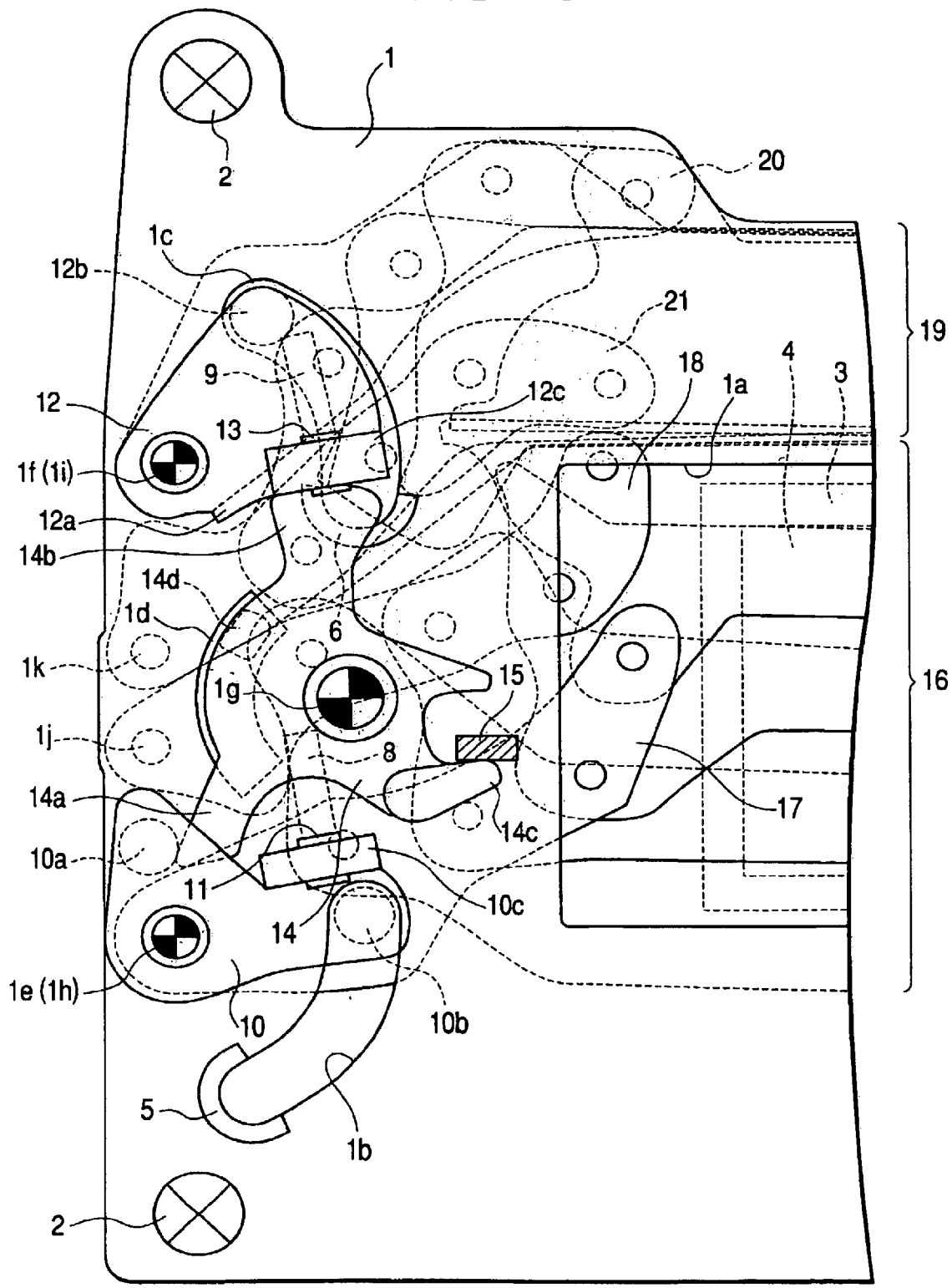
FIG. 3 is a plan view of the embodiment similar to that in FIG. 2 and shows a state in which both a first blade group and the second blade group are set after the camera is released from the state in FIG. 2.
Figure 4:
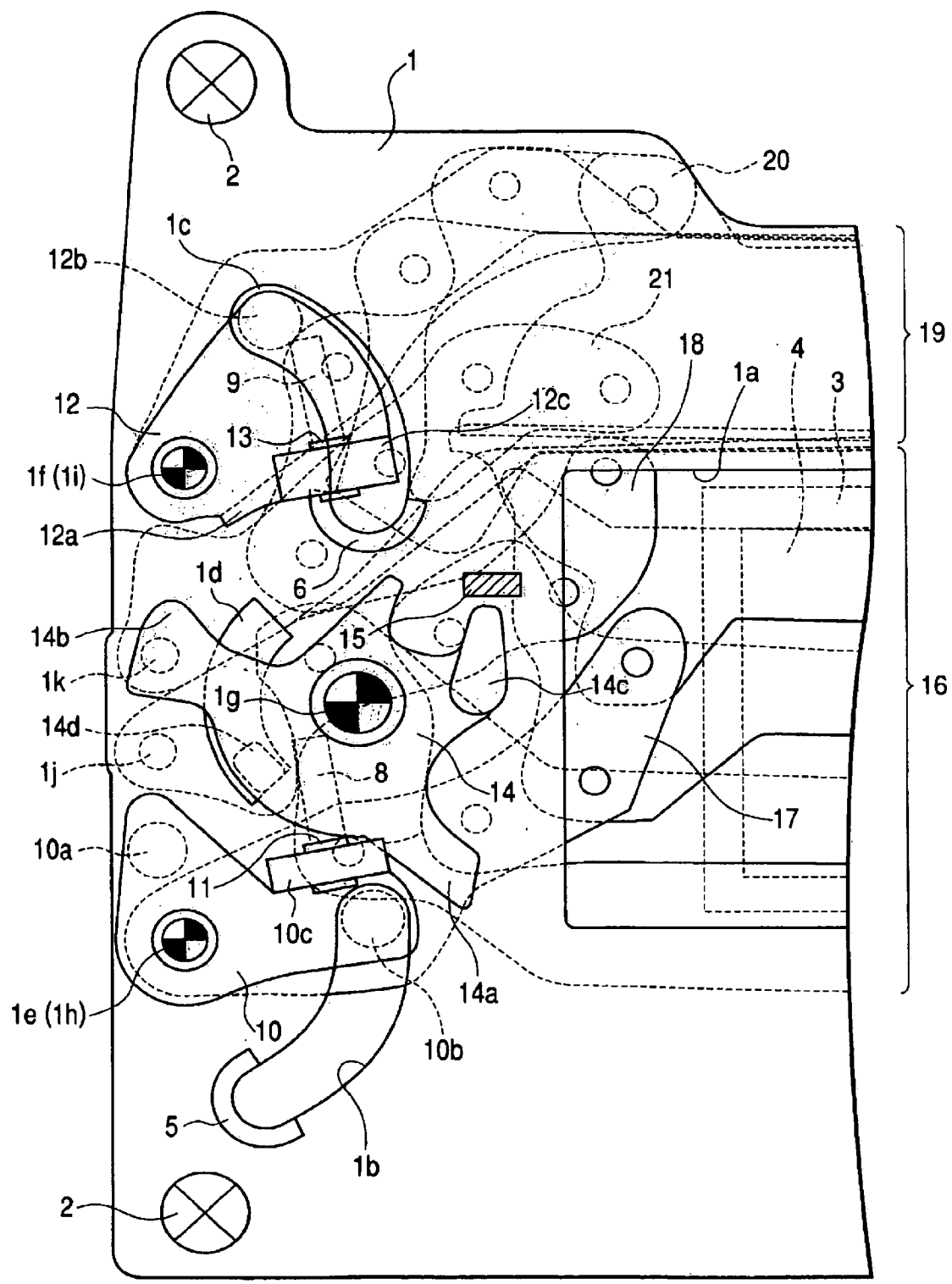
FIG. 4 is a plan view of the embodiment similar to that in FIG. 2 and shows a state in which a set member is restored to the initial position from the state in FIG. 3, namely, a state just before start of light exposure operation.
Figure 5:
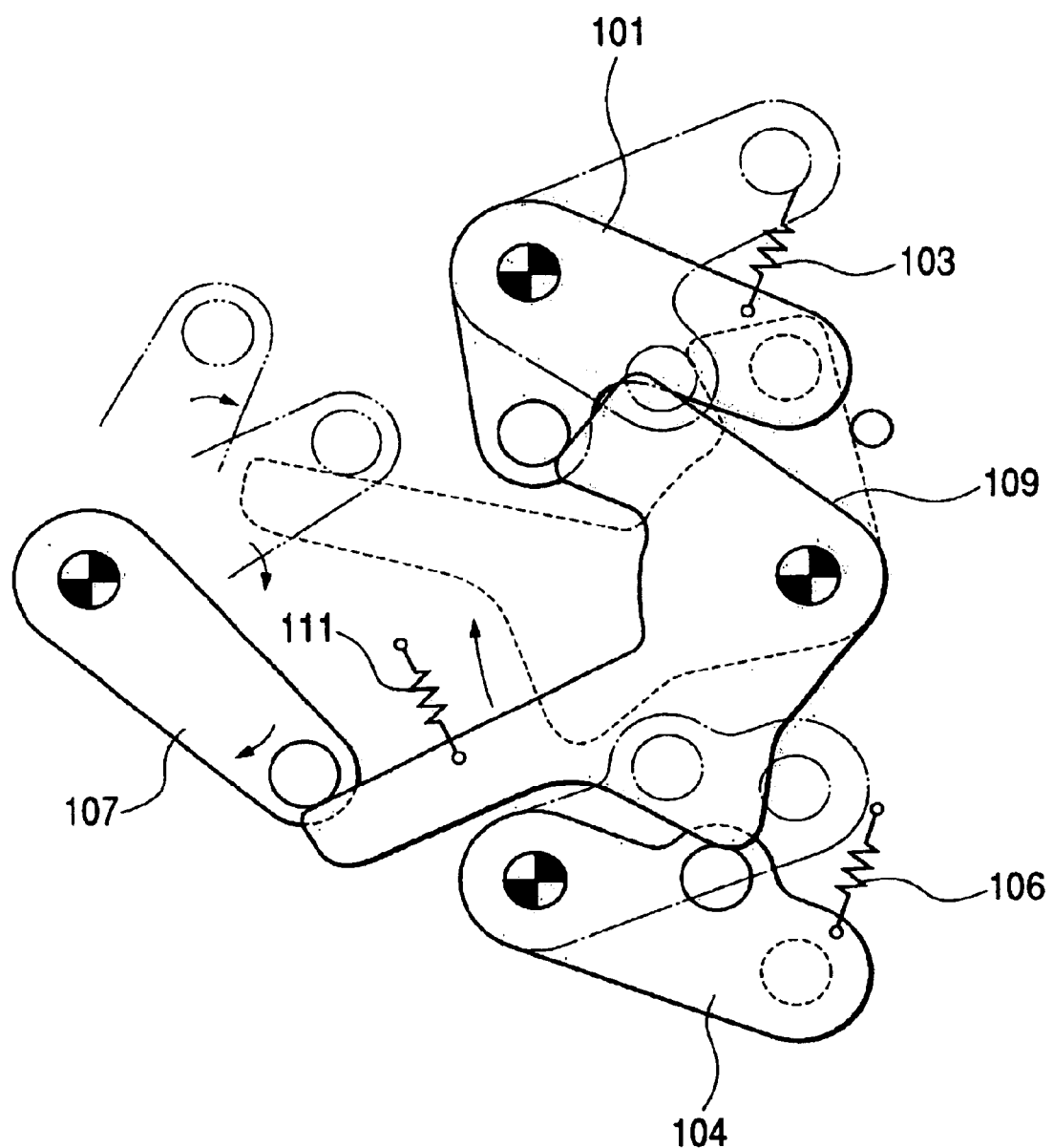
FIG. 5 is an explanatory drawing showing a related art.

An embodiment of applying the invention to a shutter of direct type will be discussed with reference to the accompanying drawings. FIG. 1 is a plan view of viewing a shutter from the subject side, namely, the photograph lens side with the shutter built in a camera and shows a state in which the main power of the camera is oft or a state just after termination of light exposure operation. FIG. 2 is a plan view of the left half of the view in FIG. 1 and shows the state of a midway position with a second blade group set and an aperture opened from the state in FIG. 1. FIG. 3 is a plan view similar to that in FIG. 2 and shows a state in which both a first blade group and the second blade group are set from the state in FIG. 2. FIG. 4 is a plan view similar to that in FIG. 2 and shows a state in which a set member is restored to the initial position from the state in FIG. 3, namely, a state just before start of light exposure operation.

The embodiment is configured as a focal-plane shutter of direct type and first and second blades use each a plurality of blades as with most of focal-plane shutters for silver-salt cameras. Thus, the blades will be referred to as first blade group and second blade group. To begin with, the configuration of the embodiment will be discussed with reference to FIG. 1 and the subject side will be referred to as the surface and the opposite side will be referred to as the rear.

In FIG. 1, a shutter base plate 1 is formed roughly at the center with a rectangular aperture 1a for light exposure. Although not shown, as known, an intermediate plate and an auxiliary base plate are attached in order with a predetermined spacing to the rear of the shutter base plate 1. A vane chamber for the first blade group is formed between the shutter base plate land the intermediate plate. A vane chamber for the second blade group is formed between the intermediate plate and the auxiliary base plate. The intermediate plate and the auxiliary base plate are also formed each with an aperture similar to the aperture 1a and usually the three apertures are put on each other for forming a light exposure aperture; in the embodiment, the shape of the aperture 1a regulates the light exposure aperture.

The shutter base plate 1 is attached to the camera main unit by screws 2 and an image pickup unit 3 is attached to the camera main unit by an appropriate method on the rear of the auxiliary base plate. In the image pickup unit 3, an image pickup device 4 of CCD, etc., is installed on an optical path on which photograph light from a photograph lens (not shown) placed on the subject side with the shutter base plate 1 between passes through the aperture 1a, and the full face of the image pickup device 4 on the photograph lens side becomes a light reception face. Under present circumstances, generally the light reception face of the image pickup device 4 is small as compared with the film face of a 35-mm conventional camera and thus is smaller than the aperture 1a.

Three arcuate slots 1b, 1c, and 1d each shaped like a circular arc are formed at the left of the aperture 1a. Shock absorbing members 5 and 6 each having a face shaped like a letter C are attached to the lower end parts of the arcuate slots 1b and 1c. Shafts 1e, 1f, and 1g are placed upright on the surface of the shutter base plate 1 and shafts 1h, 1i, 1j, and 1k are placed upright on the rear of the shutter base plate 1; the shafts 1e and 1h and the shafts 1f and 1i are placed on the same axis. A support plate 7 whose outer shape is indicated by the chain double-dashed line is attached to the tips of the shafts 1e, 1f, and 1g by an appropriate method so as to become parallel with the shutter base plate 1. A known printed wiring board (not shown) is attached to the surface of the support plate 7. A first blade electromagnet and a second blade electromagnet are attached to the support plate 7 on the shutter base plate 1 side and their coils are electrically connected to the printed wiring board, but only iron cores 8 and 9 of the electromagnets are indicated by the chain double-dashed lines in FIGS. 1 to 4.

A first blades drive member 10 made of a synthetic resin is rotatably attached to the shaft 1e of the shutter base plate 1 and is urged so as to rotate clockwise by a known first blade drive spring (not shown). The first blades drive member 10 has a pressed part 10a and a drive pin 10b on the rear and an attachment part 10c on the surface. The drive pin 10b is circular in cross section and the root part thereof can abut the buffer member 5 and the tip pierces the arcuate slot 1b and projects to the rear of the shutter base plate 1. As known, an iron piece member 11 is attached to the attachment part 10c via a spring (not shown) and can be attracted to and held on the iron core 8 of the first blade electromagnet.

A second blades drive member 12 made of a synthetic resin is rotatably attached to the shaft 1f of the shutter base plate 1 and is urged so as to rotate clockwise by a known second blade drive spring (not shown) like the first blades drive member 10. The second blades drive member 12 has a pressed part 12a on a side, a drive pin 12b on the rear, and an attachment part 12c on the surface. The drive pin 12b has the same shape as the drive pint 10b and the root part thereof can abut the buffer member 6 and the tip pierces the arcuate slot 1c and projects to the rear of the shutter base plate 1. As known, an iron piece member 13 is attached to the attachment part 12c via a spring (not shown) and can be attracted to and held on the iron core 9 of the second blade electromagnet.

A set member 14 made of a synthetic resin is rotatably attached to the shaft 1g of the shutter base plate 1 and is urged so as to rotate counterclockwise by a spring (not shown) The set member 14 is formed on a its side with a press part 14a for pressing the pressed part 10a of the first blades drive member 10, a press part 14b for pressing the pressed part 12a of the second blades drive member 12, and a pressed part 14c pressed by an operation member 15 on the camera side. The camera side mentioned here is used to mean a member not on the shutter base plate 1. The operation member 15 is driven by a motor, etc., (not shown) in a vertical direction in the FIGS. 2 to 4, and is retained by a retention mechanism (not shown) and stops at an intermediate position and a set position of the set member 14. As the operation member 15 is released from the stop position, it retreats upward. The set member 14 is formed on the rear with a pin 14d inserted into the arcuate slot 1d of the shutter base plate 1. FIG. 1 shows a state in which the set member 14 is rotated counterclockwise by a spring (not shown) and the pin 14d abuts the lower end of the arcuate slot 1d and stops. As for the set member 14, the position is the initial position.

Next, the configurations of the first blade group and the second blade group attached to the rear of the shutter base plate 1 will be discussed. To begin with, first blade group 16 is placed between the shutter base plate 1 and the intermediate plate and is made up of two arms 17 and 18 rotatably attached to the shafts 1h and 1j of the shutter base plate 1 and four blades 16a, 16b, 16c, and 16d pivotally supported in order in the length direction of the arms. The vane 16d pivotally supported at the extremity is a slit formation vane and the upper end margin of the vane 16d is a slit formation margin. An arcuate slot is made in one arm 17 of the first blade group and the drive pin 10b of the first blades drive member 10 is fitted into the arcuate slot.

On the other hand, the second blade group 19 has the same configuration as the first blade group 16 and is placed between the intermediate plate and the auxiliary base plate in a state in which the first blade group 16 is turned upside down. The second blade group 19 is made up of two arms 20 and 21 rotatably attached to the shafts 1i and 1k of the shutter base plate 1 and four blades 19a, 19b, 19c, and 19d pivotally supported in order in the length direction of the arms. The vane 19d pivotally supported at the extremity is a slit formation vane and the lower end margin of the vane 19d is a slit formation margin. The drive pin 12b of the second blades drive member 12 is fitted into an arcuate slot made in the arm 20.

Next, the operation of the embodiment will be discussed with reference to FIGS. 1 to 4. FIG. 1 is common to the main power off state with the camera unused and the state just after termination of light exposure operation. At the initial stage, in the description, it is assumed that the main power on the camera side is off. Since the focal-plane shutter of the embodiment is used with a digital camera adopting an electronic viewfinder to display a subject, when the main power is on, the aperture 1a needs to be opened even when photographing is not conducted. However, if the main power is turned off in such an open state, the operation may stop with the aperture la remaining open; in the embodiment, when the main power is off, as the operation member 15 retreats, the set member 14 is restored to the initial position by a spring (not shown) for releasing pressing each drive member. Thus, the aperture 1a is covered with the four blades 19a to 19d of the second blade group 19 for making it possible to suppress performance degradation of the image pickup device 4 caused by direct sunlight incident through the photograph lens.

In the state in FIG. 1, the blades of the first blade group 16 are superposed on each other and are stored at a position below the aperture 1a, fully opening the aperture 1a, and the blades of the second blade group 19 are placed in a development state, closing the aperture 1a. If the main power on the camera side is turned on from this state, the set operation is started and the operation member 15 presses the pressed part 14c of the set member 14 for clockwise rotating the set member 14 against the urging force of spring (not shown) Accordingly, the press part 14b of the set member 14 presses the pressed part 12a of the second blades drive member 12 for counterclockwise rotating the second blades drive member 12 against the urging force of the second blade drive spring (not shown). Thus, the arm 20 is rotated counterclockwise by the drive pin 12b and while the mutual overlap amount is increased, the blades of the second blade group 19 are superposed on each other upward, opening the aperture 1a.

The press part 14a of the set member 14 starts to press the pressed part 10a of the first blades drive member 10 after a delay since the press part 14b of the set member 14 started to press the pressed part 12a of the second blades drive member 12. Thus, the pressed part 10a of the first blades drive member 10 is rotated counterclockwise against the urging force of the first blade drive spring (not shown), and while the mutual overlap amount is lessened, the blades of the first blade group 16 are developed upward. However, the operation is once stopped before the aperture 1a is completely closed. Thus, the aperture 1a is opened by both the vane groups.

FIG. 2 shows the state in which the aperture 1a is opened at the initial stage of the set operation. When this state is entered, the operation member 15 once stops and rotation of the set member 14 is stopped accordingly. The stop position of the set member 14 in FIG. 2 is a midway position of the set operation and the press part 14b of the set member 14 presses the pressed part 12a of the second blades drive member 12 for causing the second blade group 19 to retreat from the aperture 1a. The press part 14a of the set member 14 a little presses the pressed part 10a of the first blades drive member 10 for causing the slit formation margin of the vane 16d of the first blade group 16 to face the inside of the aperture 1a, but stops at the position not covering the light reception face of the image pickup device 4. Thus, the aperture 1a is in an open state although it is not fully open and in such a state in FIG. 2, it is made possible to display a subject on the electronic viewfinder.

Just before the state in FIG. 2 is entered, the second blades drive member 12 brings the iron piece member 13 into contact with the iron core 9 of the second blade electromagnet and in the state, brings the pressed part 12a into contact with the peripheral surface of the press part 14b of the set member 14. The contact relationship of the iron piece member 13 with the iron core 9 is kept good by the attachment structure of the iron member 13 via the spring (not shown) as described above. Therefore, in the embodiment, as the set member 14 stops at the midway position, the open state of the aperture 1a is maintained, so that the need for energizing the second blade electromagnet as disclosed in JP-A-62-128675 described above is eliminated and it is made possible to suppress power consumption. If vibration or a shock is applied in this state, the second blades drive member 12 can be held reliably, so that power consumption can also be suppressed in preventing a malfunction.

Next, to photograph, if a release button of the camera is pressed in the state in FIG. 2, the operation member 15 furthermore presses the pressed part 14c of the set member 14 for rotating the set member 14 furthermore clockwise from the state in FIG. 2 against the urging force of the spring (not shown). Consequently, the press part 14a of the set member 14 presses the pressed part 10a of the first blades drive member 10, so that the first blades drive member 10 is rotated furthermore counterclockwise against the urging force of the first blade drive spring (not shown) and the drive pin 10b rotates the arm 17 counterclockwise. Thus, the blades 16a to 16d of the first blade group 16 are operated upward while they are developed, and the aperture 1a is closed by the slit formation margin of the vane 16d.

Meanwhile, the peripheral surface of the press part 14b of the set member 14 comes only in sliding contact with the peripheral surface of the pressed part 12a of the second blades drive member 12 and does not rotate the second blades drive member 12 and thus the blades 19a to 19d of the second blade group 19 remain stored in a position above the aperture 1a. Then, when the aperture 1a is completely closed by the first blade group 16, the operation member 15 stops pressing the pressed part 14c of the set member 14 and at the same time, rotation of the set member 14 is also stopped. As for the set member 14, the stop position is the set position and the state at this time is shown in FIG. 3.

At this time, at the midway position, the slit formation margin of the vane 16d is previously made to face the inside of the aperture 1a, so that the operation time until the first blade group 16 closes the aperture 1a completely is shortened and the set operation of the first blade group 16 is performed rapidly. Just before the state in FIG. 3 is entered, the first blades drive member 10 brings the iron piece member 11 into contact with the iron core 8 of the first blade electromagnet and in the state, brings the pressed part 10a into contact with the peripheral surface of the press part 14a of the set member 14. Therefore, the contact relationship of the iron piece member 11 with the iron core 8 is kept good by the attachment structure of the iron member 11 via the spring (not shown) as described above.

On the other hand, after the release switch is pressed as mentioned above, the first blade electromagnet and the second blade electromagnet are energized by a completion signal of light measurement or distance measurement and the iron cores 8 and 9 attract and hold the iron piece members 11 and 13 placed in the contact state and at the same time, the operation of the light exposure time control circuit is also started. Further, as the operation member 15 retreats upward, the set member 14 is counterclockwise rotated by the urging force of spring (not shown) from the set position in FIG. 3 and is restored to the initial position without midway stopping. FIG. 4 shows the state just before start of light exposure operation. In the process in which the set member 14 is thus restored to the initial position, first the press part 14a retreats from the pressed part 10a of the first blades drive member 10 and next the press part 14b retreats from the pressed part 12a of the second blades drive member 12. Since the iron piece members 11 and 13 are already attracted to and held on the iron cores 6 and 9, the drive members 10 and 12 are maintained in the state in FIG. 4. This state is the light exposure operation start position for the drive members 10 and 12 and the vane groups.

After the set member 14 is thus restored to the initial position, the light exposure operation is started by the light exposure time control circuit. To begin with, energizing the first blade electromagnet is shut off, counting the light exposure time is started, and the first blade group 16 is caused to perform the light exposure operation. Thus, the attraction force of the iron piece member 11 by the iron core 8 is lost and the first blades drive member 10 is rotated clockwise by the urging force of the first blade drive spring (not shown). Accordingly, the drive pin 10b of the first blades drive member 10 rotates the arm 17 clockwise from the state in FIG. 4, so that the blades 16a to 16d of the first blade group 16 are operated downward from the state closing the aperture 1a and opens the aperture 1a by the slit formation margin of the upper margin of the slit formation vane 16d while the mutual overlap amount with the adjacent blades is increased. After the blades 16a to 16d are placed in a superpose state and fully open the aperture 1a, the drive pin 10b abuts the buffer member 5 and stops. The light exposure operation of the first blades drive member 10 and the first blade group 16 is now complete.

After the expiration of a predetermined time since energizing the first blade electromagnet was shut off, energizing the second blade electromagnet is shut off by a signal from the light exposure time control circuit, whereby the second blade group 19 is caused to perform light exposure operation. Thus, the attraction force of the iron piece member 13 by the iron core 9 is lost and the second blades drive member 12 is rotated clockwise by the urging force of the second blade drive spring (not shown). Accordingly, the drive pin 12b of the second blades drive member 12 rotates the arm 20 clockwise, so that the blades 19a to 19d of the second blade group 19 are operated downward from the state opening the aperture 1a and closes the aperture 1a by the slit formation margin of the lower margin of the slit formation vane 19d while the mutual overlap amount with the adjacent blades is lessened. When the second blade group 19 is placed in the development state and closes the aperture 1a completely, the drive pin 12b abuts the buffer member 6 and stops. The light exposure operation of the second blades drive member 12 and the second blade group 19 is now complete. Thus, the light reception face of the image pickup device 4 is continuously exposed to light through the slit formed by each slit formation vane 16d, 19d. FIG. 1 shows the state just after termination of the light exposure operation.

When such light exposure operation is complete and image information of the subject is transferred to a record apparatus, the operation member 15 is again moved downward by a transfer termination signal. That is, the same operation as the main power on the camera side is turned on is performed. Consequently, the set member 14 is stopped at the position shown in FIG. 2 and again it is made possible to display a subject on the electronic viewfinder. Therefore, if the next photographing is conducted, the light exposure operation is performed as described so far.

However, if another photographing is not performed and the electronic viewfinder is not used either, the main power is turned off to avoid power consumption. Thus, as the operation member 15 retreats upward, the set member 14 is rotated counterclockwise from the state in FIG. 2 and is restored to the initial state in FIG. 1. Thus, as the pressed part 12a of the second blades drive member 12 is released from the pressed state by the press part 14b of the set member 14, the second blades drive member 12 is rotated clockwise by the urging force of the second blade drive spring (not shown). Therefore, the blades 19a to 19d of the second blade group 19 are also operated by the drive pin 12b, close the aperture 1a, and are restored to the state in FIG. 1. As for the first blade group 16, likewise, as the pressed part 10a of the first blades drive member 10 is released from the pressed state by the press part 14a of the set member 14, the first blades drive member 10 is rotated clockwise and thus the blades 16a to 16d of the first blade group 16 open the aperture 1a fully and are restored to the state in FIG. 1.

The embodiment is configured as the shutter of direct type, but the invention is not limited to the shutter of direct type and can also be applied to the shutter of retention type as mentioned above. In the embodiment, each of the first blade group and the second blade group comprises four blades, but the invention does not limit the number of blades and the number of first blades and the number of second blades may be each one.

In the embodiment, the slit formation margin of the first blade group enters the aperture to the position not covering the light reception face of the image pickup device by the time the set member reaches the midway position. However, the shapes of each press part of the set member and the pressed part of each drive member may be changed appropriately in response to upsizing of the image pickup device and the placement relationship of the image pickup device with the aperture, whereby their relative relationships may be changed and only the second blades drive member may be operated at the initial stage of the set operation. Further, in the embodiment, at the set operation time, first the second blades drive member is operated and then the first blades drive member is operated with a delay. However, the drive members can also be operated at the same time by changing the relative relationship in a similar manner to that described above.

As described above, the focal-plane shutter of the invention is excellent in that power consumption can be suppressed by eliminating the need for energizing the second blade electromagnet in the subject display state, although the focal-plane shutter is a focal-plane shutter for a digital camera comprising an electronic viewfinder. Since the state can be held mechanically by the set member, power consumption can also be suppressed in preventing a malfunction caused by vibration or a shock applied to the shutter. Further, a focal-plane shutter applied to conventional cameras can also be applied to a digital camera simply by replacing the set member of the focal-plane shutter, so that it is not necessary to largely change or complicate the configuration of the shutter; the focal-plane shutter of the invention is extremely advantageous for shutter manufacturing and cost reduction.

What is claimed is:

1. A focal-plane shutter for a digital camera, comprising:
   a shutter base plate including an aperture for light exposure;
   an operation member provided on a camera body;
   a first blades drive member for driving first blades;
   a second blades drive member for driving second blades;
   a set member being capable of reciprocating on the shutter base plate, wherein the set member operates the first and second blades drive members to a set position against an urging force of drive springs when the set member is moved by the operation member from an initial position to a set position, and the set member is restored to the initial position in association with the operation member before light exposure operation of the first and second blades drive member starts; and
   a first blades holding member and a second blades holding member, which hold each of the first and second blades drive member at a light exposure operation start position just before the light exposure operation starts and release each of the first and second blades drive members when the light exposure operation starts,
   wherein when the set member is operated from the initial position to the set position, at the initial stage, the set member operates at least the second blades drive member against the urging force of a corresponding drive spring of the drive springs and stops the second blades drive member at a midway position at which the second blades opens the aperture in association with the motion of the operation member.

2. The focal-plane shutter according to claim 1, wherein a slit formation margin of the first blades is made to enter the aperture to a position not covering a light reception face of an image pickup device placed on a photograph optical path passing through the aperture by the time the set member reaches the midway position from the initial position.

3. The focal-plane shutter according to claim 1, wherein the first and second blades holding members each comprise an electromagnet for attracting an iron piece member placed on each drive member.

4. The focal-plane shutter according to claim 1, wherein said set member comprises a first press part, and
   wherein said first blades drive member comprises a first pressed portion, said first press part of said set member being in contact with said first pressed portion of said first blades drive member.

5. The focal-plane shutter according to claim 4, wherein said set member further comprises a second press part, and wherein said second blades drive member comprises a second pressed portion, said second press part of said set member being in contact with said second pressed portion of said second blades drive member.

6. The focal-plane shutter according to claim 1, wherein said set member simultaneously contacts said first blades drive member and said second blades drive member.

7. The focal-plane shutter according to claim 1, wherein said set member sequentially contacts said first blades drive member and said second blades drive member.

8. The focal-plane shutter according to claim 1, wherein said set member rotates in a clockwise direction, to operate and rotate, in a counterclockwise direction, said first blades drive member and said second blades drive member against said urging force of said drive springs during movement from said initial position to said set position.

9. The focal-plane shutter according to claim 1, wherein said set member simultaneously operates said first blades drive member and said second blades drive member.

10. The focal-plane shutter according to claim 1, wherein said set member holds said second blades drive member during said set position.

11. The focal-plane shutter according to claim 1, wherein said second blades holding member is energized at said set position.

12. The focal-plane shutter according to claim 2, wherein said aperture is partially opened to display a subject on an electronic viewfinder and shorten closure of said aperture after said light exposure operation.

13. The focal-plane shutter according to claim 2, wherein said slit formation margin reduces an operation of said first blades from release to said set position.

14. The focal-plane shutter according to claim 1, wherein said set member rotates in a counter-clockwise direction, to operate and rotate, in a clockwise direction, said first blades drive member and said second blades drive member during movement to a power off position.

15. The focal-plane shutter for a digital camera according to claim 1, wherein said set member is contiguous with at least one of said first blades drive member and said second blades drive member.

16. A focal-plane shutter for a camera, comprising:

a shutter base plate;

an operation member provided on a camera body;

a first blades drive member for driving first blades;

a second blades drive member for driving second blades;

a set member being capable of reciprocating on the shutter base plate, wherein the set member operates the first and second blades drive members to a set position against urging forces of drive springs when the set member is moved by the operation member from an initial position to a set position; and a first blades holding member and a second blades holding member, which hold each of the first and second blades drive members at a light exposure operation start position prior to the light exposure operation starting and release each of the first and second blades drive members when the light exposure operation starts, wherein when the set member is operated from the initial position to the set position, the set member operates and contacts at least the second blades drive member against the urging forces of the drive springs and stops the second blades drive member at a midway position.

17. The focal-plane shutter according to claim 16, wherein said shutter base plate comprises an aperture, and wherein a slit formation margin of the first blades is made to enter the aperture to a position not covering a light reception face of an image pickup device placed on a photograph optical path passing through the aperture by the time the set member reaches the midway position from the initial position.

18. The focal-plane shutter according to claim 16, wherein the first and second blades holding members each comprise an electromagnet for attracting an iron piece member placed on each drive member.

19. The focal-plane shutter according to claim 16, wherein said set member comprises a first press part, and wherein said first blades drive member comprises a first pressed portion, said first press part of said set member being in contact with said first pressed portion of said first blades drive member.

20. The focal-plane shutter according to claim 16, wherein said set member further comprises a second press part, and wherein said second blades drive member comprises a second pressed portion, said second press part of said set member being in contact with said second pressed portion of said second blades drive member.

* * * * *